United States Patent [19]
Pirig et al.

[11] Patent Number: 6,054,513
[45] Date of Patent: Apr. 25, 2000

[54] INTUMESCENT COATING STABLE UNDER TROPICAL CONDITIONS

[75] Inventors: Wolf-Dieter Pirig, Euskirchen; Susanne Rothkamp, Erftstadt-Liblar; Volker Thewes, Monheim, all of Germany

[73] Assignee: Clariant GmbH, Frankfurt, Germany

[21] Appl. No.: 09/150,922

[22] Filed: Sep. 10, 1998

[30] Foreign Application Priority Data

Sep. 11, 1997 [DE] Germany .......................... 197 39 730
Aug. 6, 1998 [DE] Germany .......................... 198 35 463

[51] Int. Cl.$^7$ .................................................. C08K 5/34
[52] U.S. Cl. ........................ 524/100; 524/27; 524/35; 524/136; 524/434; 524/436; 524/492; 524/494
[58] Field of Search ................................ 524/100, 27, 35, 524/136, 434, 436, 492, 494

[56] References Cited

U.S. PATENT DOCUMENTS

| | | | |
|---|---|---|---|
| 4,123,575 | 10/1978 | Wesch et al. | 427/386 |
| 4,879,320 | 11/1989 | Hastings | 523/179 |
| 4,965,296 | 10/1990 | Hastings | 523/179 |
| 5,225,464 | 7/1993 | Hill, Jr. | 524/100 |
| 5,356,568 | 10/1994 | Levine | 252/606 |
| 5,563,208 | 10/1996 | König et al. | 524/591 |
| 5,749,948 | 5/1998 | Scholz et al. | 106/18.15 |

FOREIGN PATENT DOCUMENTS

| | | |
|---|---|---|
| 2704275 | 8/1977 | Germany . |
| 127394 | 9/1977 | Germany . |
| 295853 | 11/1991 | Germany . |
| 4218184 | 12/1993 | Germany . |
| 4343668 | 6/1995 | Germany . |
| 1476238 | 6/1977 | United Kingdom . |
| 2071111 | 9/1981 | United Kingdom . |
| 2246136 | 1/1992 | United Kingdom . |

OTHER PUBLICATIONS

Derwent Patent Family Report and/or Abstract

*Primary Examiner*—Kriellion Sanders
*Attorney, Agent, or Firm*—Miles B. Dearth

[57] ABSTRACT

The invention relates to a fireproof coating which forms an insulating layer and is based on carbon-forming substances forming a foam layer in the case of a fire, film-forming binders, blowing agents and conventional assistants and additives, wherein said coating contains, as blowing agents, a melamine salt and/or guanidine salts and/or microencapsulated melamine.

The fireproof coating forming an insulating layer and according to the invention is stable in particular under tropical conditions (up to 100% rel. humidity, about 75° C.), i.e. it releases only very little $NH_3$.

11 Claims, 1 Drawing Sheet

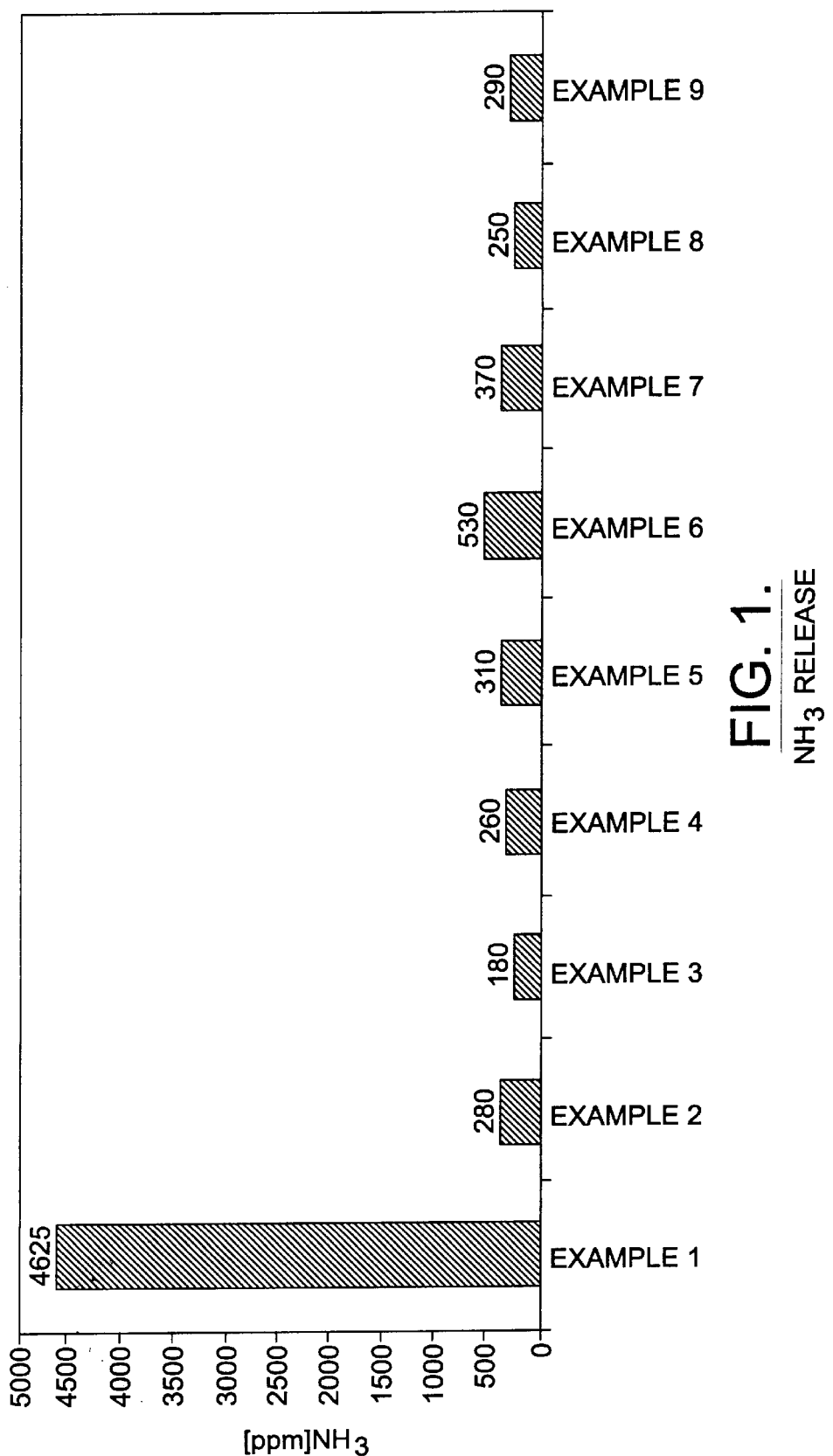

INTUMESCENT COATING STABLE UNDER TROPICAL CONDITIONS

BACKGROUND OF THE INVENTION

The invention relates to a fireproof coating which forms an insulating layer and is based on carbon-forming substances forming a foam layer in the case of a fire, film-forming binders, blowing agents and conventional assistants and additives.

Fireproof coatings forming an insulating layer, also referred to as intumescent coatings, are distinguished by the fact that they foam on appropriate action of heat in the case of a fire and, as a result of this foaming of the abovementioned fireproof coating, the passage of heat to steel structures, ceilings, walls, cables, pipes and the like is prevented or at least impeded.

U.S. Pat. No. 4,965,296 A1 describes a flame-retardant material which is composed of a flame-retardant coating material and an electrically conductive material. The flame-retardant coating material comprises foam-forming and carbon-forming substances, a gas-producing compound, a film-forming binder and corresponding solvents. Optionally, conventional, further ingredients may be present.

U.S. Pat. No. 4,879,320 describes a similar flame-retardant composition, to which however ceramic fiber material is added instead of a conductive material.

U.S. Pat. No. 5,225,464 describes an aqueous intumescent formulation based on a react on product of phosphoric acid, melamine and monoammonium phosphate, which formulation, with pentaerythritol, chlorinated hydrocarbons and further compounds, in particular, polyvinyl acetate, is said to give an improved intumescent coating material.

Numerous intumescent formulations are disclosed in "Fire Retardants Formulations Handbook" (Author: Vijay Mohan Bhatnagar, 1972).

DE 42 18 184 A1 describes an aqueous binder mixture comprising an aqueous solution and/or dispersion of a combination of a) at least one NCO prepolymer which is soluble and/or dispersible in water in the presence of component b) and has urethane groups and blocked isocyanate groups and b) a polyamine component comprising at least one (cyclo)aliphatic polyamine having at least two primary and/or secondary amino groups.

Finally, DE 43 43 668 describes expandable, flame-retardant coating materials comprising at least from 4 to 25% by weight of a film-forming binder,
from 10 to 4% by weight of ammonium polyphosphate,
from 8 to 40% by weight of at least one substance which carbonizes under the action of heat,
from 6 to 25% by weight of a blowing agent,
from 0 to 5% by weight of a dispersant,
from 0 to 25% by weight of fillers.

The disadvantage of the abovementioned fireproof coating is in general that they are halogen-containing or do not have a sufficiently wide range of uses.

Particularly in the case of formulations which contain melamine as blowing agent, it was found that these combinations release relatively large amounts of ammonia ($NH_3$) at elevated temperature and high atmospheric humidity, for example under tropical conditions.

SUMMARY OF THE INVENTION

It is therefore the object of the present invention to provide fireproof coatings which form an insulating layer and which, even under climatic conditions as are encountered, for example, in the tropics, release only very small amounts of $NH_3$—even at high atmospheric humidity and at elevated temperature.

This object is achieved by a fireproof coating of the type described at the outset which forms an insulating layer, which coating contains, as blowing agents, a melamine salt and/or guanidine salt and/or microencapsulated melamine.

DESCRIPTION OF THE PREFERRED EMBODIMENTS

The melamine salts are preferably melamine phosphate, melamine cyanurate, melamine borate and melamine silicate and the guanidine salt is preferably guanidine phosphate.

As mentioned, microencapsulated melamine is also suitable according to the invention.

The fireproof coating forming an insulating layer preferably contains from 5 to 30 parts by weight of a film-forming binder,
from 15 to 50 parts by weight of a substance forming a foam layer,
from 5 to 25 parts by weight of a carbon-forming substance,
from 5 to 50 parts by weight of the melamine salt and/or of the guanidine salt and
from 10 to 50 parts by weight of conventional assistants and additives.

The fireproof coating forming an insulating layer particularly preferably contains from 10 to 20 parts by weight of a film-forming binder,
from 25 to 40 parts by weight of a substance forming a foam layer,
from 7 to 15 parts by weight of a carbon-forming substance,
from 7 to 40 parts by weight of the melamine salt and/or of the guanidine salt and
from 20 to 40 parts by weight of conventional assistants and additives.

The fireproof coating forming an insulating layer preferably contains, as film-forming binders, homopolymers based on vinyl acetate,
copolymers based on vinyl acetate, ethylene and vinyl chloride,
copolymers based on vinyl acetate and the vinyl ester of a long-chain, branched carboxylic acid,
copolymers based on vinyl acetate and di-n-butyl maleate,
copolymers based on vinyl acetate and acrylic esters,
copolymers based on styrene and acrylic esters and/or copolymers based on acrylic esters,
vinyltoluene/acrylate copolymers,
styrene/acrylate polymers.

The fireproof coating forming an insulating layer preferably contains, as foam-forming substances, ammonium salts of phosphoric acids and/or polyphosphoric acids.

The fireproof coating forming an insulating layer preferably contains carbohydrates as carbon-forming substances. Preferably used carbohydrates are pentaerythritol, dipentaerythritol, tripentaerythritol and/or polycondensates of pentaerythritol.

The fireproof coating forming an insulating layer preferably contains, as assistants and additives, glass fibers, mineral fibers, kaolin, talc, alumina, aluminum hydroxide, magnesium hydroxide, precipitated silicas, silicates and/or powdered celluloses.

The fireproof coating forming an insulating layer and according to the invention is preferably halogen-free.

The fireproof coating forming an insulating layer and according to the invention releases than 550 ppm of $NH_3$ on storage under high (atmospheric) humidity (up to 100% rel. humidity) and at elevated temperature (about 75° C.).

The fireproof coating according to the invention (intumescent coating) is used in the form of a brushable, sprayable or rollable coating material for protecting different surfaces, preferably steel, wood, electric cables and pipes.

In the examples below, intumescent coatings were prepared and were applied to standard steel sheets and their efficiency was determined. The insulating power was tested according to DIN 4102, Part 8 (1986). The water resistance was tested by storing the coated standard steel sheets in a conditioning cabinet at 40° C. and 95% atmospheric humidity for 4 weeks before the test for the insulating power.

The following products are to be used in the examples:

® Pliolite (solid) (Goodyear/France)

This is a newtonic, thermoplastic resin based on vinyl-toluene/acrylate copolymers.

® Hostaflam AP 462 (Clariant GmbH, Frankfurt am Main)

This is a microencapsulated ammonium polyphosphate based on ® Hostaflam AP 422, which was prepared by the process of EP-B-0 180 795 and contains about 10% by weight of capsule material, comprising a cured melamine/formaldehyde resin.

® Hostaflam AP 422 (Hoechst AG, Frankfurt am Main) is a free-flowing, pulverulent, sparingly water-soluble ammonium polyphosphate of the formula $(NH_4PO_3)$ where n=20 to 1000, in particular 500 to 1000. The fraction of particles having a particle size smaller than 45 μm is more than 99%.

EXAMPLE 1

Comparison

The following substances were mixed in succession and then applied appropriately to the sheet to be tested:

38 parts by weight of ® Hostaflam AP 462
10 parts by weight of ® Pliolite (solid)
8 parts by weight of melamine
8 parts by weight of dipentaerythritol
8 parts by weight of titanium dioxide
to 100 parts by weight: thickener, plasticizer, solvent.

The fire test for the coated sheet according to DIN 4102 gave fire class F 30. After storage in the conditioning cabinet, the fire class was likewise F 30.

EXAMPLE 2

Invention

The following substances were mixed in succession and then applied appropriately to the sheet to be tested:

38 parts by weight of ® Hostaflam AP 462
10 parts by weight of ® Pliolite (solid)
22 parts by weight of melamine phosphate
8 parts by weight of dipentaerythritol
8 parts by weight of titanium dioxide
to 100 parts by weight: thickener, plasticizer, solvent.

EXAMPLE 3

Invention

The following substances were mixed in succession and then applied appropriately to the sheet to be tested:

38 parts by weight of ® Hostaflam AP 462
10 parts by weight of ® Pliolite (solid)
16 parts by weight of melamine cyanurate
8 parts by weight of dipentaerythritol
8 parts by weight of titanium dioxide
to 100 parts by weight: thickener, plasticizer, solvent.

EXAMPLE 4

Invention

The following substances were mixed in succession and then applied appropriately to the sheet to be tested:

38 parts by weight of ® Hostaflam AP 462
10 parts by weight of ® Pliolite (solid)
12 parts by weight of melamine borate
8 parts by weight of dipentaerythritol
8 parts by weight of titanium dioxide
to 100 parts by weight: thickener, plasticizer, solvent.

EXAMPLE 5

Invention

The following substances were mixed in succession and then applied appropriately to the sheet to be tested:

38 parts by weight of ® Hostaflam AP 462
10 parts by weight of ® Pliolite (solid)
21 parts by weight of melamine silicate
8 parts by weight of dipentaerythritol
8 parts by weight of titanium dioxide
to 100 parts by weight: thickener, plasticizer, solvent.

EXAMPLE 6

Invention

The following substances were mixed in succession and then applied appropriately to the sheet to be tested:

38 parts by weight of ® Hostaflam AP 462
10 parts by weight of ® Pliolite (solid)
10 parts by weight of guanidine phosphate
8 parts by weight of dipentaerythritol
8 parts by weight of titanium dioxide
to 100 parts by weight: thickener, plasticizer, solvent.

EXAMPLE 7

Invention

The following substances were mixed in succession and then applied appropriately to the sheet to be tested:

27 parts by weight of ® Hostaflam AP 422
20 parts by weight of ® Mowilith DM 510
39 parts by weight of melamine phosphate
13 parts by weight of dipentaerythritol
5 parts by weight of titanium dioxide
20 parts by weight of thickener, plasticizer, water.

EXAMPLE 8

Invention

The following substances were mixed in succession and then applied appropriately to the sheet to be tested:

27 parts by weight of ® Hostaflam AP 422
20 parts by weight of ® Mowilith DM 510
18 parts by weight of microencapsulated melamine
13 parts by weight of dipentaerythritol
8 parts by weight of titanium dioxide
to 100 parts by weight: thickener, plasticizer, solvent.

EXAMPLE 9

Invention

The following substances were mixed in succession and then applied appropriately to the sheet to be tested:

38 parts by weight of ® Hostaflam AP 462
10 parts by weight of ® Pliolite (solid)
8 parts by weight of microencapsulated melamine
8 parts by weight of dipentaerythritol
8 parts by weight of titanium dioxide
to 100 parts by weight: thickener, plasticizer, solvent.

All sheets to be tested, of Examples 2 to 9, achieved fire class F 30.

Measurement of the $NH_3$ emission

To determine the $NH_3$ release, the dried sample sheets are placed in a closed glass system. This comprises a 500 ml glass bottle and a glass cover having 2 taps. To simulate the atmospheric humidity (about 100% rel. humidity), a glass tray containing 10 ml of tap water is present in the glass system. The glass system is placed in a forced-draught drying oven at 75° C., with one tap closed. The second tap is likewise closed after 10 minutes in the drying oven. The residence time of the bottle in the drying oven from then on is 120 minutes. Thereafter, the bottle is removed from the drying oven and one tap is provided with a Dräger tube by means of an adapter. Nitrogen is fed to the second tap at a rate of 5 l per hour. The bottle is blown out for 30 minutes and the amounts of ammonia released are read directly on the Dräger tube.

DESCRIPTION OF THE DRAWING

The results of the abovementioned measurement are shown in FIG. 1, from which it is evident that the fireproof coating of Examples 2 to 7, forming an insulating layer and according to the invention, release far less (about 8 to 20 times less) $NH_3$ than the fireproof coating according to the prior art (Example 1).

What is claimed is:

1. A fireproof coating which forms an insulating layer and is based on carbon-forming substances forming a foam layer in the case of a fire, film-forming binders, blowing agents, foam-forming substances and conventional assistants and additives, wherein said coating contains, as blowing agents, a melamine salt and/or guanidine salts and/or microencapsulated melamine.

2. The fireproof coating forming an insulating layer, as claimed in claim 1, wherein the melamine salts are melamine phosphate, melamine cyanurate, melamine borate and melamine silicate and the guanidine salt is guanidine phosphate.

3. The fireproof coating forming an insulating layer, as claimed in claim 1, which contains from 5 to 30 parts by weight of a film-forming binder,
from 15 to 50 parts by weight of a substance forming a foam layer,
from 5 to 25 parts by weight of a carbon-forming substance,
from 5 to 50 parts by weight of the melamine salt and/or of the guanidine salt and
from 10 to 50 parts by weight of conventional assistants and additives.

4. The fireproof coating forming an insulating layer, as claimed in claim 1, which contains from 10 to 20 parts by weight of a film-forming binder,
from 25 to 40 parts by weight of a substance forming a foam layer,
from 7 to 15 parts by weight of a carbon-forming substance,
from 7 to 40 parts by weight of the melamine salt and/or of the guanidine salt and
from 20 to 40 parts by weight of conventional assistants and additives.

5. The fireproof coating forming an insulating layer, as claimed in claim 1, which contains, as film-forming binders, homopolymers based on vinyl acetate,
copolymers based on vinyl acetate, ethylene and vinyl chloride,
copolymers based on vinyl acetate and the vinyl ester of a long-chain, branched carboxylic acid,
copolymers based on vinyl acetate and di-n-butyl maleate,
copolymers based on vinyl acetate and acrylic esters,
copolymers based on styrene and acrylic esters and/or
copolymers based on acrylic esters,
vinyltoluene/acrylate copolymers,
styrene/acrylate polymers.

6. The fireproof coating forming an insulating layer as claimed in claim 1, wherein ammonium salts of phosphoric acids and/or polyphosphoric acids are present as foam-forming substances.

7. The fireproof coating forming an insulating layer, as claimed in claim 1, wherein carbohydrates are present as carbon-forming substances.

8. The fireproof coating forming an insulating layer, as claimed in claim 7, wherein the carbohydrates are pentaerythritol, dipentaerythritol, tripentaerythritol or polycondensates of pentaerythritol.

9. The fireproof coating forming an insulating layer, as claimed in claim 1, wherein glass fibers, mineral fibers, kaolin, talc, alumina, aluminum hydroxide, magnesium hydroxide, precipitated silicas, silicates and/or powdered celluloses are present as assistants and additives.

10. The fireproof coating forming an insulating layer, as claimed in claim 1, which is halogen-free.

11. The fireproof coating forming an insulating layer, as claimed in claim 1, which coating releases less than 550 ppm of $NH_3$ on storage under high humidity up to 100% rel. humidity and at elevated temperature (about 75° C.).

* * * * *